United States Patent
Kang et al.

(10) Patent No.: US 11,830,477 B2
(45) Date of Patent: Nov. 28, 2023

(54) FAST AND ROBUST UNSUPERVISED CONTEXTUAL BIASING FOR SPEECH RECOGNITION

(71) Applicant: salesforce.com, inc., San Francisco, CA (US)

(72) Inventors: Young Mo Kang, Redwood City, CA (US); Yingbo Zhou, Mountain View, CA (US)

(73) Assignee: Salesforce, Inc., San Francisco, CA (US)

( * ) Notice: Subject to any disclaimer, the term of this patent is extended or adjusted under 35 U.S.C. 154(b) by 259 days.

(21) Appl. No.: 16/993,797

(22) Filed: Aug. 14, 2020

(65) Prior Publication Data
US 2021/0343274 A1  Nov. 4, 2021

Related U.S. Application Data

(60) Provisional application No. 63/019,200, filed on May 1, 2020.

(51) Int. Cl.
*G10L 15/00* (2013.01)
*G10L 15/06* (2013.01)
(Continued)

(52) U.S. Cl.
CPC ............ *G10L 15/063* (2013.01); *G10L 15/16* (2013.01); *G10L 15/26* (2013.01); *G10L 2015/0631* (2013.01); *G10L 2015/088* (2013.01)

(58) Field of Classification Search
CPC ....... G10L 15/063; G10L 15/16; G10L 15/26; G10L 2015/0631; G10L 2015/088; G10L 15/22; G10L 15/00
See application file for complete search history.

(56) References Cited

U.S. PATENT DOCUMENTS 7,831,426 B2 * 11/2010 Bennett ................. G06F 40/237
                                                   704/270.1
8,442,812 B2 *  5/2013 Ehsani .................. G10L 15/193
                                                   704/231
(Continued)

OTHER PUBLICATIONS

M. Padmanabhan and M. Picheny, "Large-vocabulary speech recognition algorithms," in Computer, vol. 35, No. 4, pp. 42-50, Mar. 2002, doi: 10.1109/MC.2002.993770. (Year: 2002).*

(Continued)

*Primary Examiner* — Paras D Shah
*Assistant Examiner* — Uthej Kunamneni
(74) *Attorney, Agent, or Firm* — HAYNES AND BOONE, LLP (57) ABSTRACT

An automatic speech recognition (ASR) system that determines a textual representation of a word from a word spoken in a natural language is provided. The ASR system uses an acoustic model, a language model, and a decoder. When the ASR system receives a spoken word, the acoustic model generates word candidates for the spoken word. The language model determines an n-gram score for each word candidate. The n-gram score includes a base score and a bias score. The bias score is based on a logarithmic probability of the word candidate, where the logarithmic probability is derived using a class-based language model where the words are clustered into non-overlapping clusters according to word statistics. The decoder decodes a textual representation of the spoken word from the word candidates and the corresponding n-gram score for each word candidate.

20 Claims, 6 Drawing Sheets

(51) Int. Cl.
  *G10L 15/26* (2006.01)
  *G10L 15/16* (2006.01)
  *G10L 15/08* (2006.01)

(56) References Cited

U.S. PATENT DOCUMENTS

| | | | |
|---|---|---|---|
| 10,573,312 B1* | 2/2020 | Thomson | G10L 15/22 |
| 2014/0214405 A1* | 7/2014 | Ouyang | G06F 3/04886 704/9 |
| 2018/0203852 A1* | 7/2018 | Goyal | G06F 40/56 |

OTHER PUBLICATIONS

G. Pundak, T. N. Sainath, R. Prabhavalkar, A. Kannan and D. Zhao, "Deep Context: End-to-end Contextual Speech Recognition," 2018 IEEE Spoken Language Technology Workshop (SLT), Athens, Greece, 2018, pp. 418-425, doi: 10.1109/SLT.2018.8639034. (Year: 2018).*

Aleksic et al., "Bringing contextual information to google speech recognition," in Interspeech 2015, International Speech Communications Association, 2015, 5 pages.

Aleksic et al., "Improved recognition of contact names in voice commands," in 2015 IEEE International Conference on Acoustics, Speech and Signal Processing (ICASSP), Apr. 2015, pp. 5172-5175.

Brown et al., "Class-based n-gram models of natural language," Computational Linguistics, vol. 18, No. 4, 1992, pp. 467-480.

Chen et al., "End-to-end contextual speech recognition using class language models and a token passing decoder," in ICASSP 2019—2019 IEEE International Conference on Acoustics, Speech and Signal Processing (ICASSP), 2019, pp. 6186-6190.

Edwards et al., "Medical speech recognition: Reaching parity with humans," in Speech and Computer, A. Karpov, R. Potapova, and I. Mporas, Eds. Cham: Springer International Publishing, 2017, pp. 512-524.

Graves et al., "Connectionist temporal classification: Labelling unsegmented sequence data with recurrent neural networks," in Proceedings of the 23rd International Conference on Machine Learning, ser. ICML '06, New York, NY, USA: Association for Computing Machinery, 2006, pp. 369-376.

Hall et al., "Composition-based on-the-fly rescoring for salient n-gram biasing," in Interspeech 2015, International Speech Communications Association, 2015, 5 pages.

He et al., "Streaming end-to-end speech recognition for mobile devices," in ICASSP 2019—2019 IEEE International Conference on Acoustics, Speech and Signal Processing (ICASSP), 2019, pp. 6381-6385.

Heafield, "KenLM: faster and smaller language model queries," in Proceedings of the EMNLP 2011 Sixth Workshop on Statistical Machine Translation, Edinburgh, Scotland, U nited Kingdom, Jul. 2011, pp. 187-197.

Liang, "Semi-supervised learning for natural language," in Master's Thesis, MIT, 2005, 86 pages.

Martin et al., "Algorithms for bigram and trigram word clustering," Speech Communication, vol. 24, No. 1, 1998, pp. 19-37.

Maskey et al., "Improved name recognition with meta-data dependent name networks," in 2004 IEEE International Conference on Acoustics, Speech, and Signal Processing, vol. 1, May 2004, pp. 1-789-1-792.

McGraw et al., "Personalized speech recognition on mobile devices," in 2016 IEEE International Conference on Acoustics, Speech and Signal Processing (ICASSP), Mar. 2016, pp. 5955-5959.

Merkel, "Docker: Lightweight linux containers for consistent development and deployment," Linux J., vol. 2014, No. 239, Mar. 2014.

Saon et al., "English conversational telephone speech recognition by humans and machines," in Proc. Interspeech 2017, 2017, pp. 132-136.

Scheiner et al., "Voice search language model adaptation using contextual information," in 2016 IEEE Spoken Language Technology Workshop (SLT), Dec. 2016, pp. 253-257.

Stratos et al., "A spectral algorithm for learning class-based n-gram models of natural language," in Proceedings of the Thirtieth Conference on Uncertainty in Artificial Intelligence, ser. UAI' 14, Arlington, Virginia, USA: AUAI Press, 2014, p. 762-771.

Vasserman et al., "Contextual language model adaptation using dynamic classes," in 2016 IEEE Spoken Language Technology Workshop (SLT), 2016, pp. 441-446.

Xiong et al., "The microsoft 2017 conversational speech recognition system," in Proc. IEEE ICASSP, IEEE, Apr. 2018, pp. 5934-5938.

Zhou et al., "Improving end-to-end speech recognition with policy learning," in 2018 IEEE International Conference on Acoustics, Speech and Signal Processing (ICASSP), 2018. pp. 5819-5823.

* cited by examiner

| Training Stage 302 |
|---|
| 306 ⟶ Build class-based language model $C$ |
| 308 ⟶ Store $P_C(w\|C(w))$ for $\forall w \in \mathcal{V}$ |
| 310 ⟶ Discard $C$ |
| Inference Stage 304 |
| 312 ⟶ Evaluate $s_B(w\|H)$ and $s(w\|H)$ |
| 314 ⟶ Decode with $s(w\|H)$ |

*FIG. 3*

| 3-gram | $s_G$ | $\log P(w\|C(w))$ | $s_B$ |
|---|---|---|---|
| <s> world | -4.1 | -0.5 | $0.5\lambda$ |
| <s> world cup | -1.5 | -0.9 | $0.9\lambda$ |
| world cup is | -1.6 | -0.1 | 0 |
| cup is not | -1.4 | -0.3 | 0 |
| is not a | -1.0 | -0.2 | 0 |
| not a cup | -3.9 | -0.9 | 0 |
| a cup </s> | -1.1 | - | 0 |
| <s> <unk> | -8.7 | - | $\alpha$ |
| <s> <unk> is | -2.4 | -0.1 | 0 |
| <unk> is not | -1.9 | -0.3 | 0 |
| is not a | -1.0 | -0.2 | 0 |
| not a cup | -3.9 | -0.9 | 0 |
| a cup </s> | -1.1 | - | 0 |

Rows 1–7: 402
Rows 8–13: 404

FAST AND ROBUST UNSUPERVISED CONTEXTUAL BIASING FOR SPEECH RECOGNITION

PRIORITY DATA

This application claims priority to U.S. Provisional Application No. 63/019,200 filed on May 1, 2020 and entitled "Fast and Robust Unsupervised Contextual Biasing for Speech Recognition," which is incorporated by reference in its entirety.

TECHNICAL FIELD

The embodiments are generally directed to automatic speech recognition systems, and more specifically to language models in the automatic speech recognition systems.

BACKGROUND

With recent advances in artificial neural network architectures, automatic speech recognition (ASR) system performance is rapidly closing its gap with that of human accuracy, making it prevalent in many applications. The ASR system can generate captions for meetings or in videos. The ASR system can also serve as a front-end to numerous downstream tasks such as speech translation, a virtual personal assistant, and a voice-activated navigation system to name a few.

Despite its success in general transcription tasks, a conventional ASR system may not accurately recognize domain-specific or personalized words and phrases. This is because the ASR system's language model is trained with finite amount of general speech data and this general speech data may have a distribution that differs from the personalized or target speech context. For example, names in a user's contact list are personalized and are usually out-of-vocabulary (OOV) words that are not in the general speech data. Because the language model is typically not trained on the OOV words, these words are likely to have a very low language model score. Due to the low language model score, the OOV words, such as names in the user's contact list, are difficult to accurately predict. Other examples of OOV words may be a user's current location, songs in the user's playlist, or restaurants in a restaurant list. The OOV words may also be topic-specific, such as terms in a medical domain or trending terms. In these scenarios, the contextual information that includes the OOV words is not static. The embodiments below describe how the contextual information is dynamically incorporated into the language model scoring during the inference stage of the ASR system, which causes the ASR system to accurately translate the OOV words.

In the figures and appendix, elements having the same designations have the same or similar functions.

DETAILED DESCRIPTION

The embodiments disclose an automatic speech recognition (ASR) system that assigns a bias score for each provided context term. The ASR system has improved accuracy from a conventional ASR system when relevant context is available and is robust against false-triggering errors from irrelevant terms.

The ASR system described herein is an improvement from the conventional ASR systems for several reasons. First, the ASR system does not dynamically construct an explicit contextual language model which is a processor and memory intensive process. Second, the ASR system does not use metadata or class annotations for the context or the training corpus. Third, in the ASR system the bias score for every vocabulary is pre-computed during the training stage. Fourth, the ASR system distributes the bias scores in a way that suppresses false triggering errors.

As used herein, the terms "network" and "model" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Figure 1:
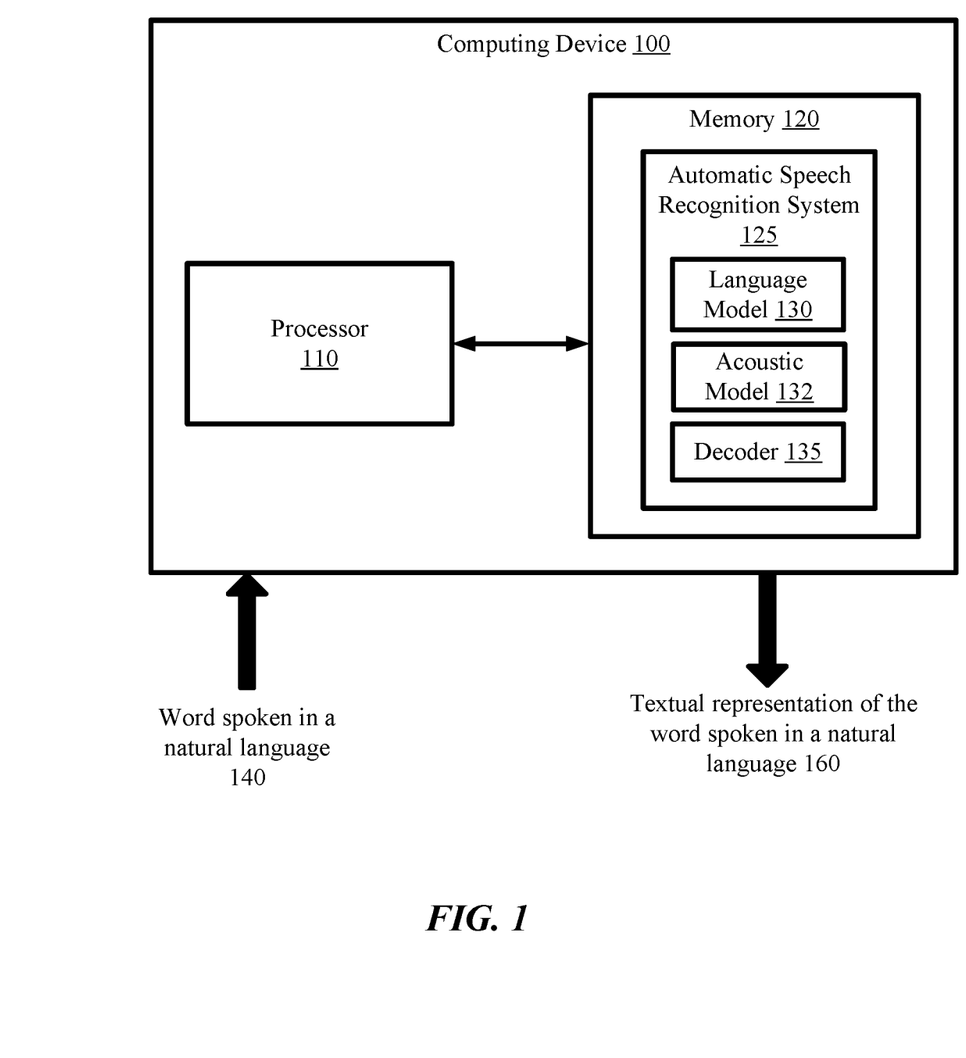
FIG. 1 is a simplified diagram of a computing device for implementing an automatic speech recognition (ASR) system, according to some embodiments.

FIG. 1 is a simplified diagram of a computing device 100 for implementing an automatic speed recognition (ASR) system, according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include non-transitory, tangible, machine readable media that includes executable code that when run by one or more processors (e.g., processor 110) may cause the one or more processors to perform the methods described in further detail herein. For example, as shown, memory 120 includes instructions for an ASR system 125, language model G 130, acoustic model 132, and decoder 135 that may be used to implement and/or emulate the systems and models, and/or to implement any of the methods described further herein. In some embodiments, ASR system 125 may include language model G 130, acoustic model 132, and decoder 135. Further, language model G 130, acoustic model 132, and decoder 135 may include one or more neural networks or may be combined into one neural network. In some examples, the ASR system 125 may receive one or more words spoken in a natural language or simply spoken words 140 as input and generate a textual representation 160 of the spoken words 140 as output. Once the ASR system 125 receives spoken words 140, acoustic model 132 may convert the spoken words 140 into word candidates. The language model G 130 may generate a score for the word candidates. In some embodiments, acoustic model 132 and/or language model G 130 may include an encoder. Decoder 135 may receive the word candidates generated by acoustic model 132 and the scores generated by language model G 130 and/or acoustic model 132 and determine the textual representation 160 that corresponds to spoken word 140 from one of the word candidates.

Figure 2:
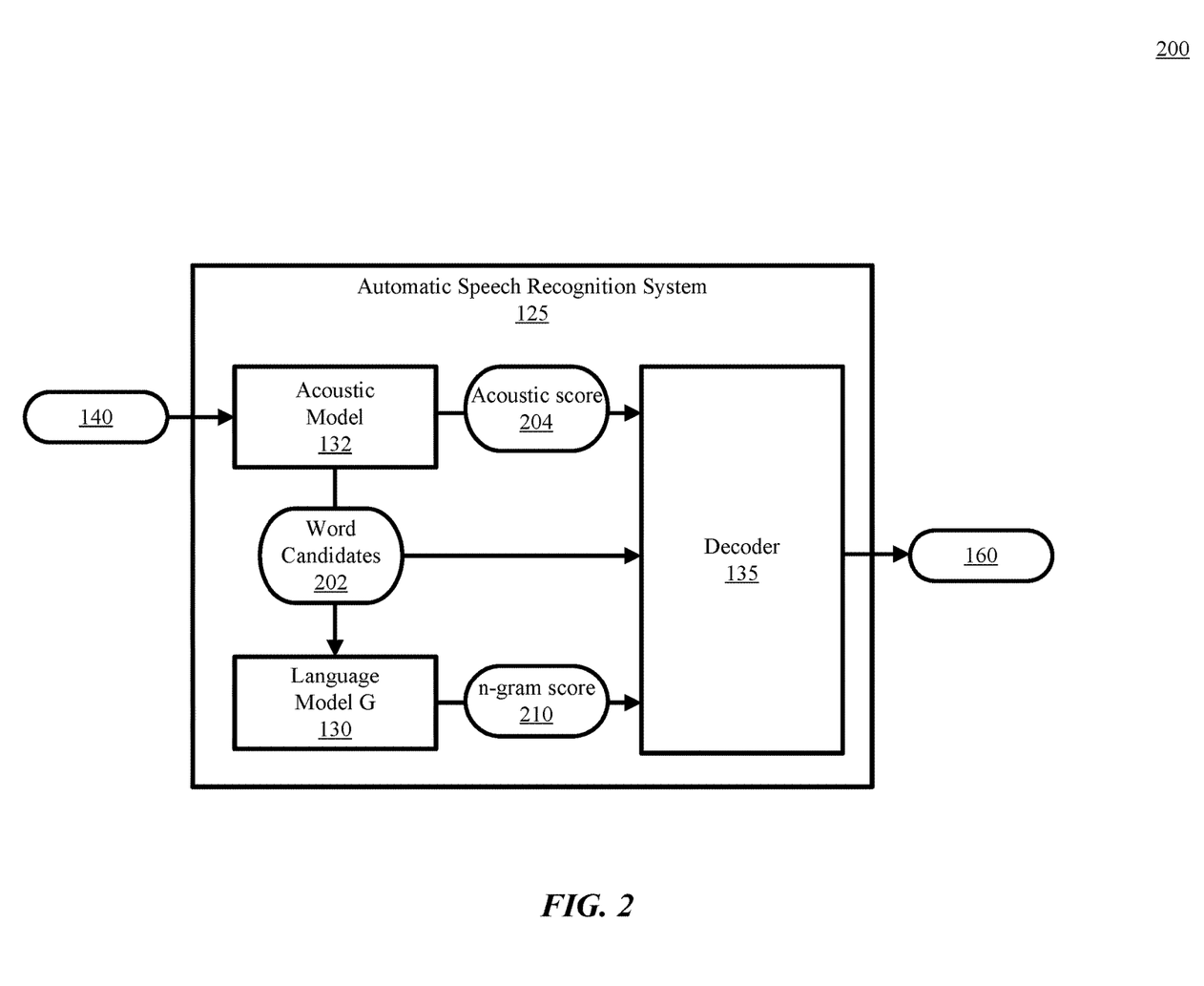
FIG. 2 is a block diagram of an automatic speech recognition system, according to some embodiments.

FIG. 2 is a block diagram 200 of an ASR system, according to some embodiments of the disclosure. ASR system 125 includes language model G 130 (which may also be referred to as language model G 130) and which may be a general language model, acoustic model 132, and decoder 135.

As discussed above, acoustic model 132 may translate spoken words 140 into word candidates 202. In some embodiments, acoustic model 132 may receive spoken word or words 140 and generate word candidate(s) 202 that are textual representations of spoken word or words 140. Acoustic model 132 may also generate a corresponding acoustic score 204 that corresponds to each word candidate(s) 202. In some embodiments, spoken words 140 may be audio signals that acoustic model 132 translates into phonemes or other linguistic units that make up speech. These phonemes or linguistic units may be word candidates 202. Acoustic model 132 may be trained using hours and hours of audio signals that may include words in a spoken natural language.

In some embodiments, language model G 130 may receive the output of acoustic model 132, such as word candidates 202. Language model G 130 may be constructed from a training corpus that includes words from a natural language dictionary or vocabulary V. In some embodiments, language model G 130 may be an n-gram language model, but the embodiments are also applicable to other types of language models. Language mode G 130 may generate a score 210 for each word candidate in word candidates 202. Score 210 may include a base score $s_G(\cdot)$ and a bias score $s_B(\cdot)$. The base score $s_G(\cdot)$ may be a log probability of a word candidate in word candidates 202 being textual representation 160 of spoken word 140.

In some embodiments, word candidates 202 may be a part of a context of a spoken word 140, where the context is list of N words $B=(w_1, w_2, \ldots, w_N)$. The context may be a group of words, a sentence, or a phrase. Language model G 130 may receive word candidates 202 from the context and generate score 210 for each word w in the context B. Each score 210 may be n-gram score s(w|H) which is fed into a decoder 135, discussed in further detail below. The word w in the n-gram score s(w|H) may be a current candidate word in B, while H may be a history of words that language model G 130 processed prior to the current candidate word w. In the baseline case where the context is not provided, score 210 may be s(w|H)=sc(w|H)=log(PG(w|H)), where score 210 is the log-probability of the n-gram determined by the language model G 130.

Figure 3:
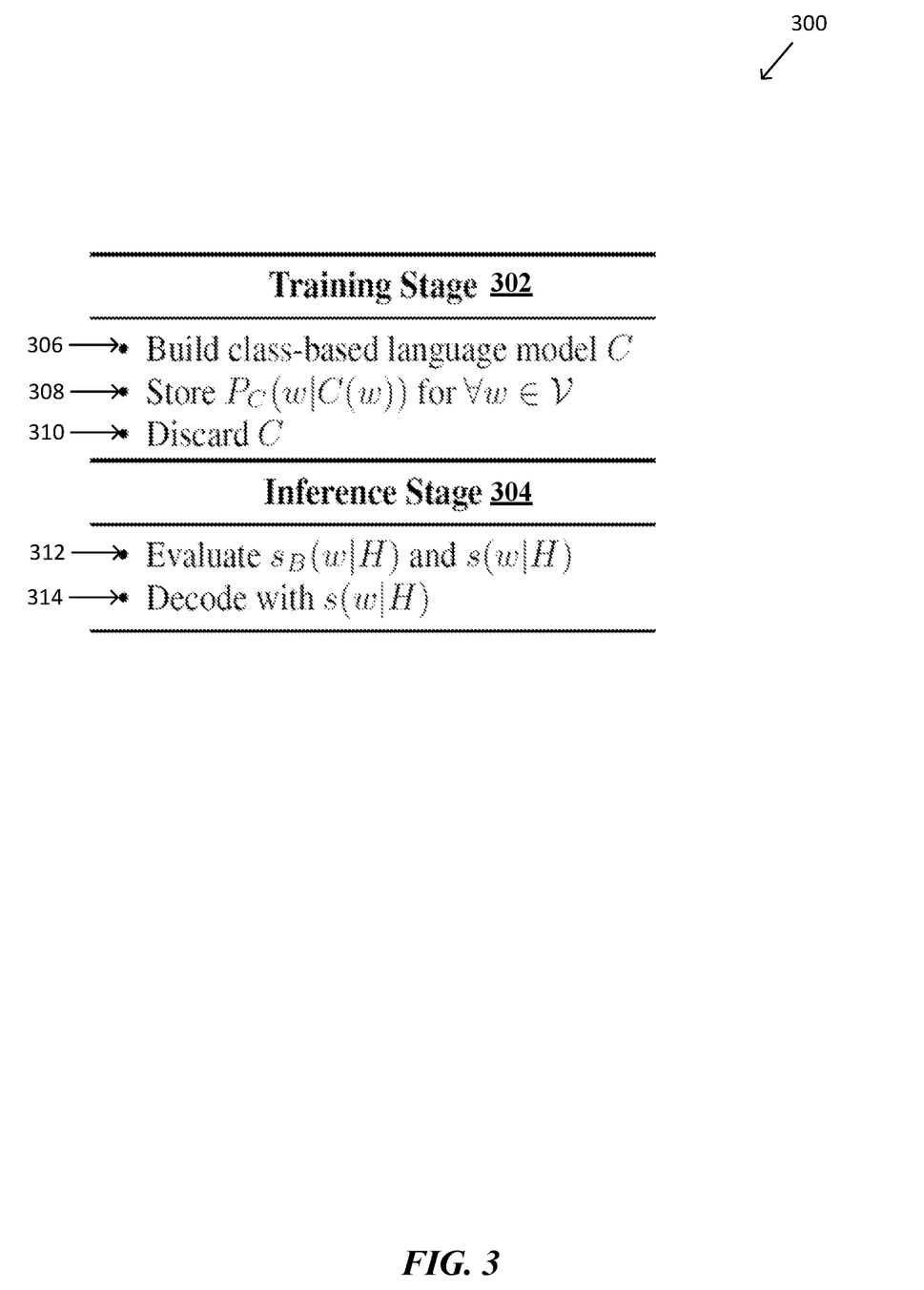
FIG. 3 is a diagram of an algorithm for determining a textual representation of a spoken word, according to some embodiments.

In some embodiments, language model G 130 may bias word w in word candidates 202 by including a biasing score in score 210. In this way, the bias may be interpreted qualitatively, such that the positive bias favors the language model G 130 to predict the given word w, the negative bias discourages the language model G 130 to predict the given word w, and zero bias coincides with the baseline case. To bias a word w in words candidates 202, language model G 130 may represent score 210 as a boost score that is added to the base score, as illustrated below:

$$s(w|H)=s_G(w|H)+s_B(w|H) \tag{1}$$

where $s_B(\cdot)$ is the bias score and base score $s_G(\cdot)$ for a word w. As illustrated in Equation 1 above, when language model G 130 determines score 210, which is score s(w|H) for word w, score 210 includes the score $s_G(w|H)$ and the bias score $s_B(w|H)$. In some embodiments, language model G 130 may determine the bias score using the word statistics determined from a class-based language model, which is further discussed with reference to FIG. 3, below.

Once language model G 130 generates score 210 for each word candidate in word candidates 202, language model G 130 may pass score 210 to decoder 135. In some embodiments, along with score 210 for each word candidate 202, decoder 135 may receive one or more word candidates 202. Decoder 135 may also receive acoustic score 204 for each word candidate 202. Using the one or more word candidates 202, score 210 for each word candidate 202 that was generated using language model G 130 and/or acoustic score 204 for each word candidate 202 that was generated using acoustic model 132, decoder 135 may decode the word candidates 202 into textual representation 160 for a given spoken word 140. As decoder 135 may be a neural network, the output of decoder 135 may be a probability score for each word candidate 202, and the word candidate 202 that corresponds to the highest probability score may be selected as textual representation 160 of spoken word 140.

FIG. 3 is a diagram 300 that illustrates an algorithm for training an ASR system and using the ASR system to predict a word, according to some embodiments. As illustrated in FIG. 3, the algorithm is divided into a training stage 302 and an inference stage 304. During training stage 302, ASR system 125 is trained using a training corpus of spoken words. ASR system 125 is also trained to determine bias scores $s_B(\cdot)$ for different words. Once trained, ASR system 125 may be used in inference stage 304 to translate one or more spoken words 140 into one or more textual representation 160 of spoken words 140.

In some embodiments, during training stage 302, ASR system 125 may construct a class-based language model C as shown in step 306 of the algorithm in FIG. 3. The class-based language model C may be constructed using an unsupervised method that clusters words in vocabulary V into non-overlapping classes. An example cluster may include words that are days of the week, or words that are months of the year. The clustering may be based on n-gram statistics. An example unsupervised method may include class-based n-gram algorithms, such as a spectral algorithm for learning class-based n-gram models or algorithms used in bi-gram or tri-gram word clustering. The n-gram probability from the class-based model C is illustrated below:

$$P_C(w_n|w_1 \ldots w_{n-1}) = P_C(C(w_n)|C(w_1) \ldots C(w_{n-1})) \times P_C(w_n|C(w_n)) \quad (2)$$

where $C(w_i)$ is the class identifier for the word $w_i$. Further, the first term in Equation 2 models class-level n-gram and the second term in Equation 2 accounts for the word count in the training corpus relative to other words sharing similar n-gram statistics. In the embodiments, when $P_G(w|H) \approx P_C(w|H)$, Equation 2 may decouple $s_G(w|H)$ into intrinsic n-gram nature and its word count. Further, biasing the word as if it appears more often in the training corpus yet retaining the n-gram statistics of the word, is to leave the first term intact and raise the second term up to unity (i.e., probability of one). In other words, $s_B(w) \leq -\log P_C(w|C(w))$ describes a reasonable upper bound of the boost that may be applied to the word w without disturbing its inherent n-gram statistics.

After ASR system 125 generates the class-based language model C, the ASR system 125 may store then-gram probability Pc(w|C(w)) for each word in vocabulary V as illustrated in step 308 in the algorithm in FIG. 3. In some embodiments, the ASR system 125 may store the n-gram probability Pc(w|C(w)) for each word in memory 120 discussed in FIG. 1, such that the n-gram probability Pc(w|C(w)) for each word is accessible to language model G 130. Once ASR system 125 determines and stores then-gram probability Pc(w|C(w)) for each word, the class-based language model C may be discarded as illustrated in step 310.

As discussed in FIG. 2, during the inference stage 304, language model G130 determines the score 210 of each word candidate 202. As part of determining score 210, as illustrated in step 312, language model G 130 determines the bias score $s_B(\cdot)$ and base score $s_G(\cdot)$ using Equation 1. To determine the bias score $s_B(\cdot)$, for a give word win context B, language model G 130 may use a bias function, illustrated below:

$$s_B(w|H) = \begin{cases} -\lambda \log \log P_C(w|C(w)) & w \in B, w \in V \\ \alpha & w \in B, w \notin V \\ 0 & w \notin B \end{cases} \quad (3)$$

where $\lambda \geq 0$ is a scale factor and $\alpha \geq 0$ is a boost score for out-of-vocabulary word w that is in the context B but is not in a vocabulary V. For example, suppose word w is included in both the context B and in the vocabulary V. As discussed above, vocabulary V may by a dictionary vocabulary of a natural language used to train language model G 130. In this case, the bias score $s_B(w|H)$ is a log probability derived from the class-based language model C multiplied by A. Because the $s_B(w|H)$ in this case is negative, score 210 is biased against the out-of-vocabulary word. In another example, suppose the out-of-vocabulary word w is in context B but is not in a vocabulary V. In this case, the bias score $s_B(w|H)$ may be a boost score $\alpha$. Because the boost score $\alpha \geq 0$, the score 210 may be increased by the value of $\alpha$. In another example, the out-of-vocabulary word w may not be in the context B. In this case, the bias score may be zero and does not change the base score $s_G(w|H)$. Notably the bias function $s_B$ is independent of the history H of the previous words processed by the ASR system 125 but is dependent on the given word w. This property avoids computationally expensive dynamic language model construction overhead at inference stage 304.

Because unsupervised clustering is performed, there is no guarantee that all words of the same category perceived by humans will fall into the same class. For example, with the trained corpus, clustered into i.e. 5,000 classes, the words "Shanghai", "Graz", "Hyderabad", and "Stockholm" may be clustered into the same class, but words "Robert" and "William" may be clustered into different classes. This implies that there are other words in the train corpus sharing more similar n-gram statistics to "Robert" than "William".

After language model G 130 determines score 210 for each word w by adding the base score $s_G(w|H)$ and bias score $s_B(w|H)$, in step 314, decoder 135 may use score 210 for each word candidate 202 to determine textual representation 160 of the spoken word 140 as discussed in FIG. 2.

In some embodiments, the bias function in Equation 3 has multiple benefits. First, the explicit contextual language model is not constructed from the provided context. In this case, if context |B| is large, the conventional construction of the language model results in significant overhead during the inference stage. On the other hand, if context |B| is small, the bias score obtained from the model is not an accurate representation of the probability. Because conventional techniques rely on the provided context's statistics to assign a bias score, the conventional techniques impose a burden on accurate extraction and generation of the context. In contrast, the embodiments herein use the provided context only to test the condition w∈B, thereby relieving the burden. The logarithmic probably score that is associated with the w that may be in context B and which may be included to determine the bias score has been derived during training stage 302.

Second, unlike conventional techniques, language model G 130 does not require external metadata or class annotations from a human user. This is beneficial because it is difficult and costly to find labels for arbitrary words or phrases of given categories. The conventional techniques employing class-level language model assume annotations that are available for not only the contextual phrases but also for train corpus. Because annotations may not be available to train corpus, the type of applicable context is limited. The embodiments herein, in contrast, rely on unsupervised clustering and therefore do not require explicit class labels for the contextual phrases or the train corpus, which allows the techniques to be implemented on a wider range of context, including user-provided context.

Third, the proposed method pre-computes the bias score for every word in the vocabulary during the training stage 302. This results in a minimal overhead during the inference stage 304. In addition, the bias score is static for a fixed word across different users. On the other hand, conventional techniques output unstable bias scores in the sense that they fluctuate across different users as the context B statistics change. Consider, for example, two sets of context: $B_1$=("Shanghai") and $B_2$=("Shanghai", "Graz", "Hyderabad", "Stockholm"). Using the conventional techniques, there may be different bias scores even for the same word "Shanghai." Specifically, the conventional techniques may yield $S_{B1}$ (Shanghai)>$S_{B2}$ (Shanghai). To overcome such effect, a complex heuristic function may be required to scale the bias inversely proportional to |B|. With the embodiments described herein, the bias score for a given context word, such as "Shanghai" is fixed for both context $B_1$ and $B_2$.

Lastly, the proposed embodiments prevent over-biasing by imposing an upper bound on the boost score such that it does not alter its n-gram nature within the corpus. Observe that $P_C$ (w|C(w))≈1 for a dominant word within its class would yielding $s_B$(w)≈0. In other words, if the context word w is already a common word in the train corpus and thus already has a high score $s_G$, the bias score $s_B$ would be close to zero, thus preventing over-biasing. On the other hand, if w is a rare word or an out-of-vocabulary word, then a large bias score $s_B$ would be applied to compensate for its low score $s_G$. For example, with the train corpus used in the experiment, we observe that words "trade" and "barter" fall into the same cluster with $s_B$(trade)/λ=4.241. This confirms that the word "trade" is more common term than the word "barter".

One may argue that similar distribution can also be modeled from the unigram probability of language mode G 130 and may propose a relationship between the bias score $s_B$ for the word w that is a function of a logarithmic probability of the word associated with language model G 130 as follows:

$$s_B(w) = -\lambda \log P_G(w) \quad (4)$$

The equation 4 may replace the first condition in Equation 3. This may pertain to an example where the number of clusters in the class-based language model is set to one. In this case, the first term in Equation 2 would be a constant and the second term may equal the unigram $P_G$ (w), yielding Equation 4. Further, reducing the number of classes may improve performance with relevant context but may make the performance more susceptible to false-triggering errors. In another example, the number of clusters may be equal to the vocabulary |V|, which translates to $P_G(\cdot) = P_C(\cdot)$.

Figure 4:
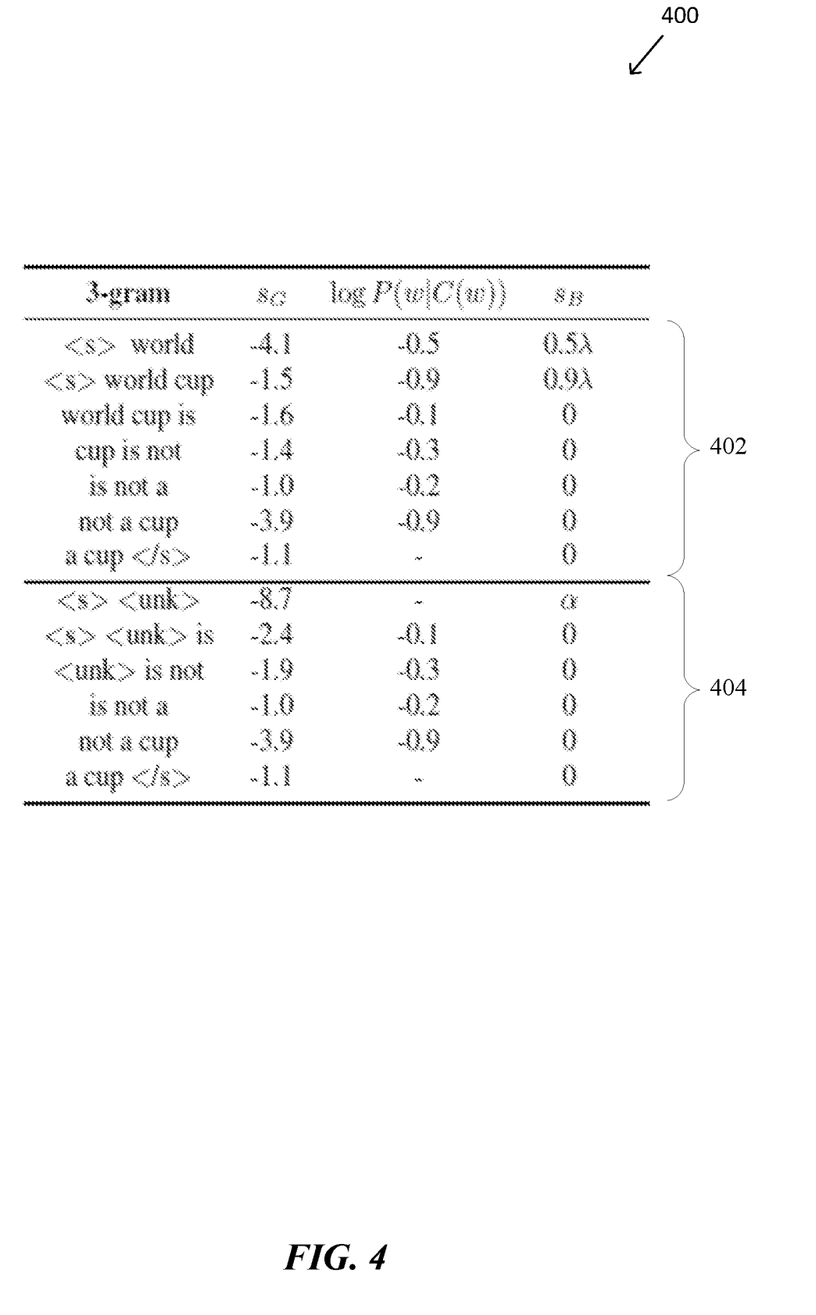
FIG. 4 illustrates outcomes for determining phrases from spoken words by using an expansion scheme and an out-of-vocabulary (OOV) scheme, according to some embodiments.

In some embodiments, language model G 130 may be extended to handle a phrase and out of vocabulary words using an expansion scheme and an out-of-vocabulary (OOV) scheme. In the expansion scheme, the individual words in the phrase may be biased only if the entire phrase is an exact match. For example, given a context phrase "world cup", the biases $s_B$ (world) and $s_B$ (cup) may both apply to the decoding beam when the decoding beam contains the complete phrase "world cup". FIG. 4 illustrates a table 400 that demonstrates the expansion scheme 402 with an example sentence "world cup is not a cup". Notably that the boost 0.9λ is applied in the 3-gram "<s> world cup" but not in "not a cup". One way of implementing the exact match condition is to add the phrase into the decoder dictionary as a single token, i.e., "world-cup" and to apply word-level biases to this token but not to individual words comprising it, i.e., "world" or "cup". This results in multiple beams with the same transcription, such as "world-cup" as a single token and "world cup" as two tokens. In this example, the decoder 135 may keep the highest-scoring beam and discard others.

In another embodiment, an out-of-vocabulary (OOV) scheme may treat every context phrase of two or more words as a single OOV context word. The context phrase is then boosted with a fixed bias score as in Equation 3. This is because in many cases a context phrase represents a single entity as a whole and its n-gram statistics within the phrase seen in the train corpus may not accurately represent the given context. Rather than relying on its intra-phrase statistics from the train corpus, the scheme simply treats the entire phrase as a single unknown word. FIG. 4 illustrates the results of an OOV scheme 404 that removes intra-phrase n-gram scores during decoding.

In some embodiments, for the context words not in the dictionary, there is nothing that language model G 130 can do other than assign the unknown token. In this case, all OOV context words will be biased the same way, and ASR system 125 may rely on acoustic score 204 to discern the correct word.

Figure 5:
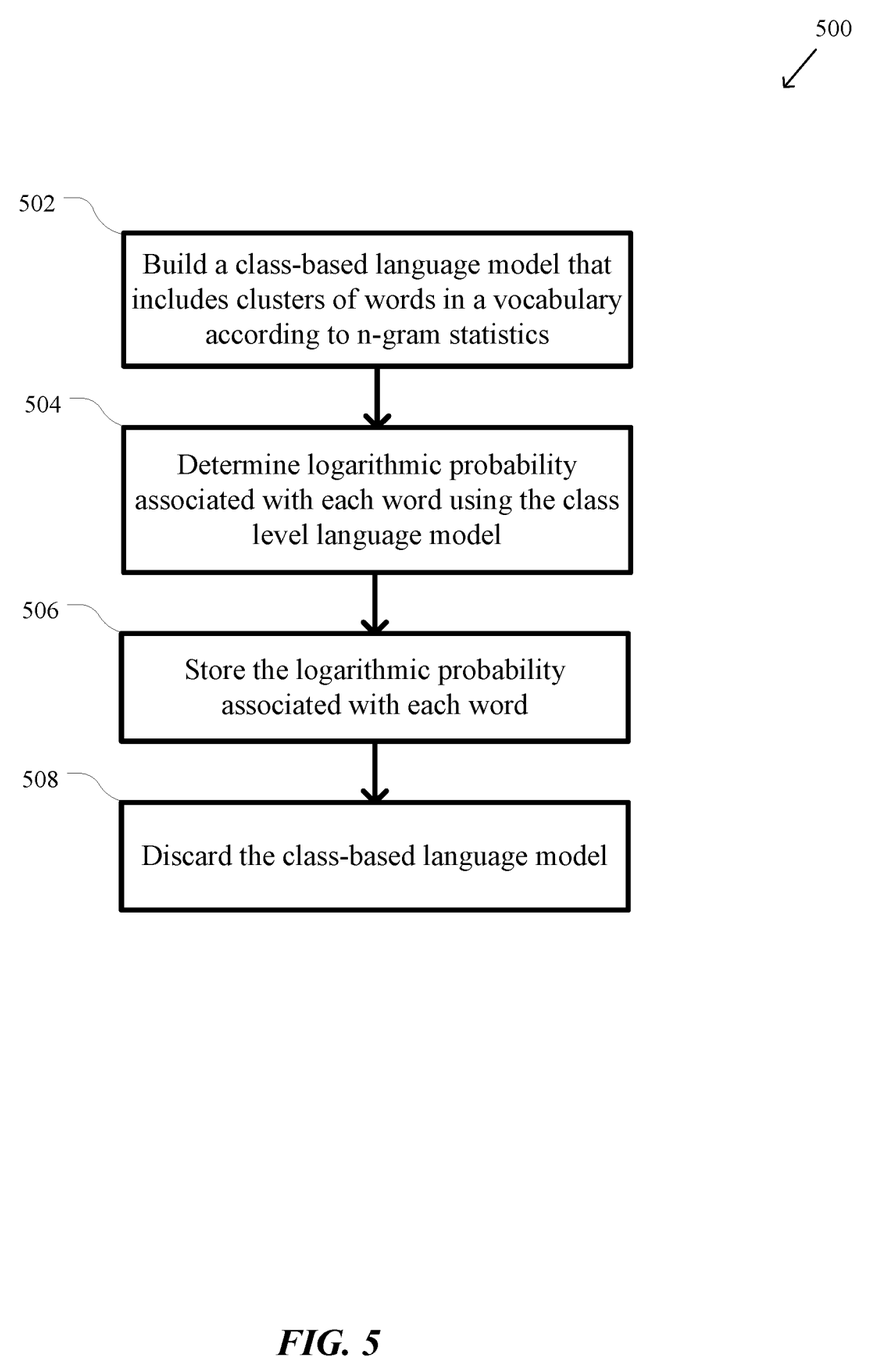
FIG. 5 is a simplified diagram of a method determining a log probability for words using a class-based language model, according to some embodiments.

FIG. 5 is a simplified diagram of a method 500 for determining a log probability for words using a class-based language model, according to some embodiments. One or more of the processes 502-508 of method 500 may be implemented, at least in part, in the form of executable code stored on non-transitory, tangible, machine-readable media that when run by one or more processors may cause the one or more processors to perform one or more of the processes 502-508. Processes 502-508 comprise the training stage 302 discussed in FIG. 3, and may complete prior to ASR system 125 determining a textual representation 160 of one or more spoken words 140.

At process 502, a class level language model is built. For example, ASR system 125 may build a class level (or class-based) language model by clustering words into non-overlapping classes according to n-gram statistics. The words may be words from a dictionary in a natural language or from another vocabulary V of words.

At process 504, logarithmic probabilities for the words in the class level language model are determined. The logarithmic probabilities may correspond to the statistics of a word in the class level language model and may indicate a class that is associated with the word. As discussed above, language model G 130 may determine bias scores for the words using the logarithmic probability for the words derived using the class level language model.

At process 506, the logarithmic probabilities for the words determined in processes 504 are stored in memory 120 or another memory accessible to language model G 130.

At process 508, the class level language model is discarded. For example, ASR system 125 may discard the class level language model to save memory space. Instead, ASR system 125 may store logarithmic probabilities for the words that were determined using the class level language model.

Figure 6:
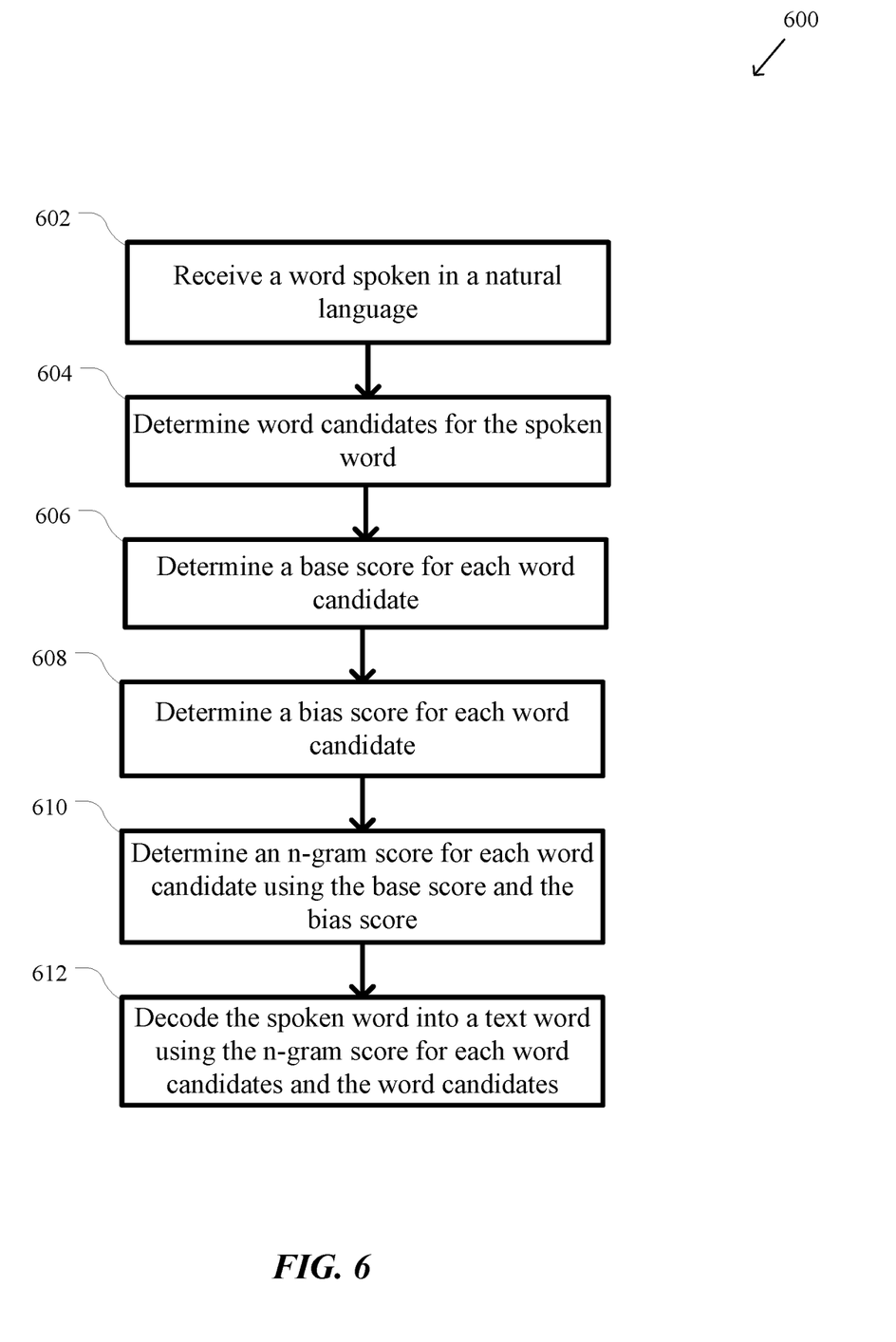
FIG. 6 is a simplified diagram of a method for determining a textual representation of a spoken word, according to some embodiments.

FIG. 6 is a simplified diagram of a method 600 for determining a textual representation of a word spoken in a natural language, according to some embodiments. One or more of the processes 602-612 of method 600 may be implemented, at least in part, in the form of executable code stored on non-transitory, tangible, machine-readable media that when run by one or more processors may cause the one or more processors to perform one or more of the processes 602-612. Processes 602-612 may include the inference stage 304 discussed in FIG. 3.

At process 602, a word spoken in a natural language is received. For example, ASR system 125 receives word spoken 140 in a natural language.

At process 604, word candidates are determined. For example, acoustic model 132 may determine word candidates 202 from spoken word 140. The word candidates 202 may correspond to words in context B. In some embodiments, acoustic model 132 may also determine acoustic score 204 for each word candidate in word candidates 202.

At process 606, a base score for each word candidate is determined. For example, a base score for each word candidate in word candidate 202 is determined using the language model G 130. As discussed above, the base score may be determined using the logarithmic probability for each word candidate determined from the language model G 130.

At process 608, a bias score for each word candidate is determined. For example, language model G 130 may access the logarithmic probability for each word candidate determined from the class level language model C as discussed in FIGS. 3 and 5, and use the logarithmic probability for each word candidate to determine the bias score for the word candidate. Notably, process 608 may bias the out-of-vocabulary word w that corresponds to word candidates 202 to have a higher bias score than the word w that is a common word.

At process 610, an n-gram score for each word candidate is determined. For example, language model G 130 may determine the n-gram score, that is score 210, for each word candidate in word candidates 202 by combining the base score determined in process 606 and the bias score determined in process 608.

At process 612, the textual representation of the word spoken word is determined. For example, decoder 135 may use word candidates 202 and the n-gram score (score 210) that corresponds to each word candidate to determine the textual representation 160 for the spoken word 140. In some embodiments, decoder 135 may also use acoustic score 204 for each word candidate in addition to score 210 for each word candidate to determine the spoken word 140.

Some examples of computing devices, such as computing device 100 may include non-transitory, tangible, machine readable media that include executable code that when run by one or more processors (e.g., processor 110) may cause the one or more processors to perform the processes of methods 500 and 600. Some common forms of machine readable media that may include the processes of methods 500 and 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. An automatic speech recognition (ASR) system, the system comprising:
 a language model in the ASR system, the language model configured to:
  receive a word candidate in word candidates that correspond to a spoken word in a context;
  determine a base score for the word candidate, wherein the base score is a first logarithmic probability of the word candidate being a textual representation of the spoken word;
  receive a second logarithmic probability for the word candidate generated by a class-based language model;
  determine a bias score associated with the word candidate, wherein the bias score is based on the second logarithmic probability, whether the candidate word is in the context for the spoken word and whether the candidate word was included in a vocabulary that trained the language model; and
  combine the base score and the bias score of the word candidate into an n-gram score of the word candidate; and
 a decoder neural network in the ASR system, the decoder neural network configured to determine the textual representation of the spoken word in a natural language using the n-gram score associated with the word candidate.

2. The ASR system of claim 1, wherein the language model is configured to increase the base score with the bias score for the word candidate that is an out-of-vocabulary word, wherein the out-of-vocabulary word is a word that is not included in a vocabulary used to train the language model.

3. The ASR system of claim 1, wherein the language model is configured to decrease the base score with the bias score for the word candidate that is a vocabulary word, wherein the vocabulary word is a word that is included in a vocabulary used to train the language model.

4. The ASR system of claim 1, further configured to:
 build the class-based language model using a second vocabulary of words, wherein the class-based language model has a plurality of non-overlapping classes of words according to n-gram statistics for the words in the second vocabulary of words;
 determine a logarithmic probability for a word in the second vocabulary of words from the class-based language model, wherein the logarithmic probability is based on a class in the non-overlapping classes; and
 store the logarithmic probability for the word in the second vocabulary of words in a memory accessible to the language model.

5. The ASR system of claim 1, further comprising:
 an acoustic model configured to receive the spoken word and determine the word candidates for the spoken word.

6. The ASR system of claim 5, wherein the acoustic model is further configured to determine an acoustic score for the word candidate in the word candidates; and
the decoder neural network is further configured to determine the textual representation of the spoken word using acoustic scores associated with the word candidates.

7. The ASR system of claim 1, wherein the bias score does not depend on previous words received by the ASR system and the base score depends on the previous words received by the ASR system.

8. A method comprising:
receiving, at a language model stored in memory and executing on a processor, a word candidate in word candidates that correspond to a spoken word in a context;
determining, using the language model, a base score for the word candidate, wherein the base score is a first logarithmic probability of the word candidate being a textual representation of the spoken word;
receiving a second logarithmic probability for the word candidate generated by a class-based language model;
determining a bias score associated with the word candidate, wherein the bias score is based on the second logarithmic probability, whether the candidate word is in the context for the spoken word and whether the candidate word was included in a vocabulary that trained the language model; and
combining the base score and the bias score of the word candidate into an n-gram score of the word candidate; and
determining, using a decoder neural network, the textual representation of the spoken word in a natural language using the n-gram score associated with the word candidate.

9. The method of claim 8, further comprising:
increasing, using the language model, the base score with the bias score for the word candidate that is an out-of-vocabulary word, wherein the out-of-vocabulary word is a word that is not included in a vocabulary used to train the language model.

10. The method of claim 8, further comprising:
decreasing the base score with the bias score for the word candidate that is a vocabulary word, wherein the vocabulary word is a word that is included in a vocabulary used to train the language model.

11. The method of claim 8, further comprising:
prior to determining the textual representation for the spoken word, building the class-based language model using a second vocabulary of words, wherein the class-based language model has a plurality of non-overlapping classes of words according to n-gram statistics for the words in the second vocabulary of words;
determining a logarithmic probability for a word in the second vocabulary of words using the non-overlapping classes in the class-based language model;
storing the logarithmic probability for the word in a memory accessible to the language model; and
deleting the class-based language model.

12. The method of claim 8, further comprising:
receiving, at an acoustic model, the spoken word;
determining, at the acoustic model, the word candidates for the spoken word;
determining, at the acoustic model, an acoustic score for the word candidate in the word candidates; and
determining, using the decoder neural network, the textual representation of the spoken word using the acoustic score associated with the word candidate.

13. An automatic speech recognition (ASR) system, comprising:
a class-based language model of the ASR system trained on a vocabulary of words and including a plurality of non-overlapping classes of words according to n-gram statistics for the words in the vocabulary of words;
a language model of the ASR system, the language model configured to:
generate logarithmic probabilities for words in the vocabulary of words based on the non-overlapping classes generated by the class-based language model; and
determine a base score and a bias score for at least one word candidate for a spoken word, wherein the bias score is based on one of the logarithmic probabilities, whether the candidate word is in a context for the spoken word and whether the candidate word was included in a vocabulary that trained the language model; and
a decoder neural network of the ASR system, the decoder neural network configured to convert the at least one word candidate into a textual representation of the spoken word in a natural language based on a combination of the base score and the bias score.

14. The ASR system of claim 13, wherein:
the language model is configured to increase the base score with the bias score for the at least one word candidate that is an out-of-vocabulary word, wherein the out-of-vocabulary word is a word that is not included in a vocabulary used to train the language model.

15. The ASR system of claim 13, wherein:
the language model is configured to decrease the base score with the bias score for the at least one word candidate that is a vocabulary word, wherein the vocabulary word is a word that is included in a vocabulary used to train the language model.

16. The ASR system of claim 13, further configured to:
delete the class-based language model after the logarithmic probabilities for words in the vocabulary of words has been determined.

17. The ASR system of claim 13, further comprising:
an acoustic model configured to receive the spoken word and determine the at least one word candidate for the spoken word and an acoustic score for the at least one word candidate.

18. The ASR system of claim 13, wherein the decoder neural network is further configured to determine the textual representation of the spoken word using acoustic scores associated with the at least one word candidate and the combination of the base score and the bias score.

19. The ASR system of claim 13, wherein the bias score does not depend on previous words processed by the ASR system and the base score depends on the previous words processed by the ASR system.

20. The ASR system of claim 1, wherein the language model is further configured to:
receive a second word candidate in the word candidates corresponding to the spoken word;
determine a second base score for the second word candidate;
determine a second bias score for the second word candidate; and combine the second base score and the second bias score into a second n-gram score for the second word candidate; and wherein the decoder neural network is further configured to determine the textual representation of the spoken word using the n-gram score associated with the word candidate and second word candidate.

\* \* \* \* \*